Sept. 7, 1954  A. O. RIORDAN  2,688,517
PNEUMATIC CONVEYING SYSTEM
Filed June 5, 1952  4 Sheets-Sheet 1
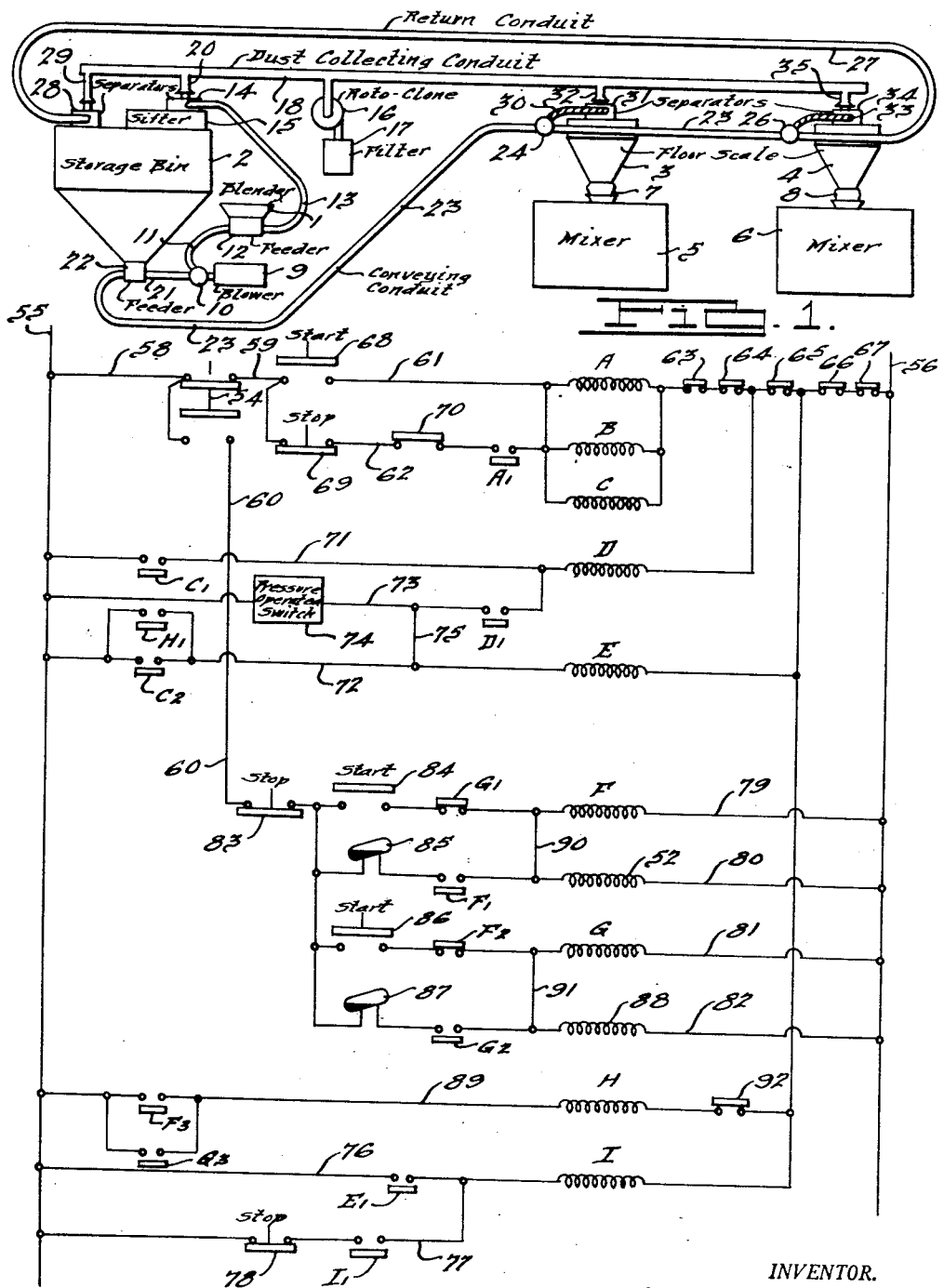
INVENTOR.
Albert O. Riordan.
BY
ATTORNEYS.

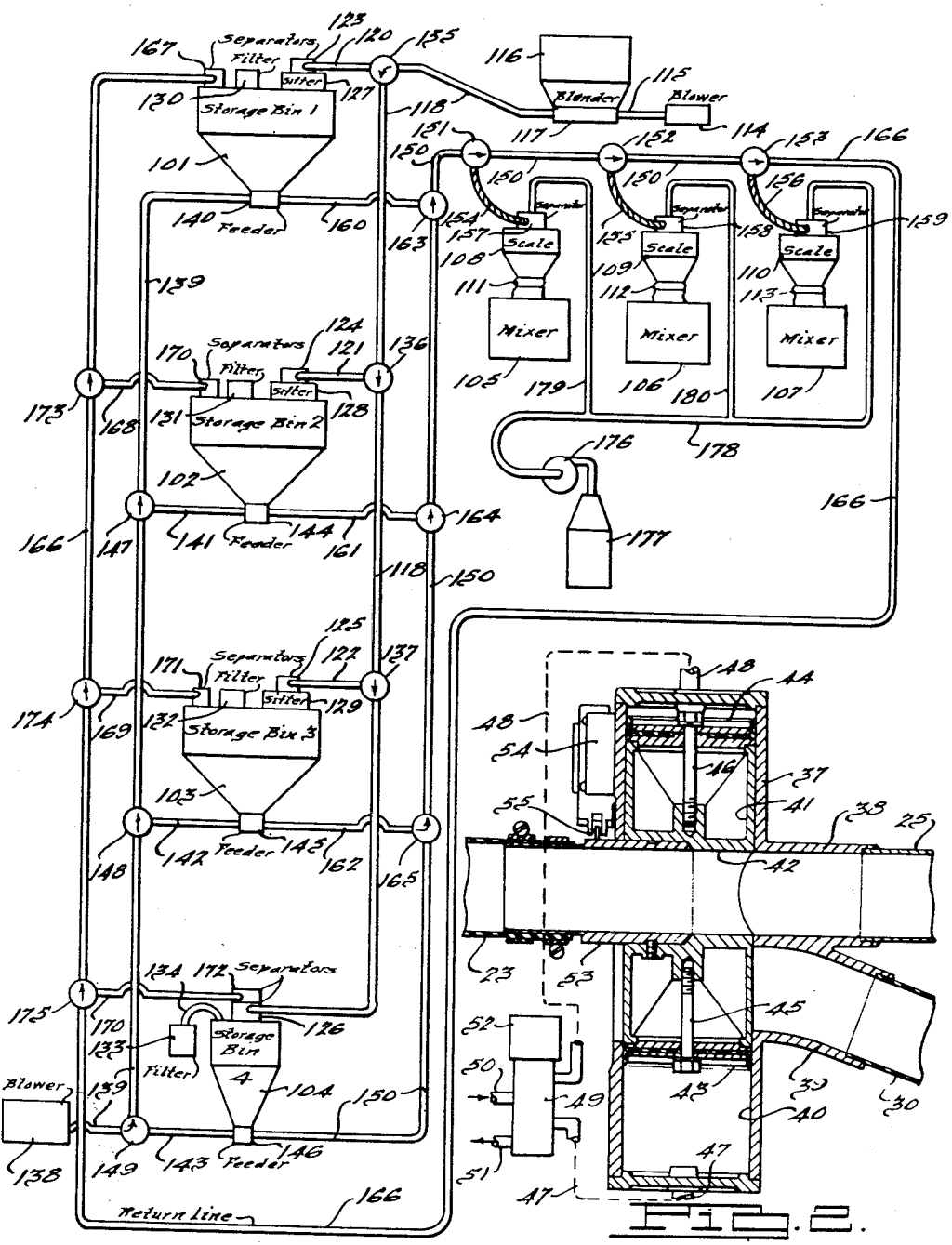

Patented Sept. 7, 1954

2,688,517

UNITED STATES PATENT OFFICE 2,688,517

PNEUMATIC CONVEYING SYSTEM

Albert O. Riordan, Saginaw, Mich., assignor to Baker Perkins Inc., Saginaw, Mich., a corporation of New York Application June 5, 1952, Serial No. 291,837

13 Claims. (Cl. 302—28)

1

The present invention relates to pneumatic conveying systems and particularly to systems adapted for use in conveying flour in bakeries, where it is necessary to convey a fixed weight of flour from a bin to a mixer at frequent intervals to produce batches of bread dough.

It has been proposed that a previously weighed quantity of flour be fed into a pneumatic conveyer and delivered by the conveyer to a mixer located at a more or less remote point. See, for example, the patents to Hicks No. 1,256,017, Lauterbur et al. No. 2,003,716 and Israel No. 2,572,862. An objection to that type of system lies in the fact that it is necessary to separate all of the flour from the conveying air at the mixer to avoid delivering a short weight. Since commercial flour contains a substantial percentage of fines which float easily in almost still air, it is necessary to employ in the previously proposed systems a large and expensive separator at the mixer.

In prior nonpneumatic bakery conveying systems, it has been common practice to position a weighing scale over the mixer. The conveyer, usually of the screw type, delivers flour to the scale hopper until the scale beam tips and automatically stops the conveyer. The flour then is dumped by gravity from the scale hopper into the mixer. However, this arrangement of a scale hopper over the mixer cannot be used with any prior pneumatic conveying systems for several reasons. In the first place, most bakery buildings do not have sufficient headroom to permit the positioning of both a scale hopper and a standard cyclone separator, one above the other and both above a mixer. More important, it is not possible to stop any of the prior pneumatic conveyers when the scale hopper has received the desired amount of flour because the flour in the line between the storage bin and the separator over the scale hopper would drop out of suspension and clog the line as soon as flow ceased. Any time a pneumatic flour conveyer is stopped with flour in the line, it becomes so clogged that all of the conveyer pipes must be taken down and cleaned out. To stop the conveyer, it is necessary to stop the feed of flour to the conveyer intake and continue the flow of air until the line is cleared of flour. It is not possible to estimate with the requisite degree of accuracy the amount of flour in the line and allow for that amount in the scale beam setting. Moreover, in many cases a mixer may draw flour from any one of several bins located at different distances from the mixer and the quantity of flow in the line will be different in each case.

2

It is the general object of this invention to provide an improved, simplified and relatively inexpensive pneumatic conveying system for conveying material, such as flour, to a desired destination from a larger quantity in a bin or other storage chamber.

More particularly, it is an object of this invention to provide a conveying system of the type mentioned which is peculiarly suited for use in conveying flour to the dough mixer or mixers in a commercial bakery in that the mixer at the desired destination receives only a predetermined weight of flour.

Another object of the invention is to provide a system of the type mentioned in which it is not necessary to employ large and expensive cyclone separators.

A further object of the invention is to provide a system of the type mentioned capable of delivering flour to any one of a plurality of destinations from a single source or from any one of a plurality of sources.

Another object of the invention is to provide an improved and simplified electrical control circuit for such systems.

Other objects and advantages of the invention will become apparent from the following specification, the accompanying drawings, and the appended claims.

In the drawings:

Figure 1 is a diagrammatic illustration of an elementary form of the invention;

Figure 2 is a sectional view showing the construction of one of the conveyer line valves employed;

Figure 3 is a diagram of an electrical control circuit for the system shown in Figure 1;

Figure 4 is a diagrammatic illustration of a more elaborate embodiment of the invention.

Figure 5:
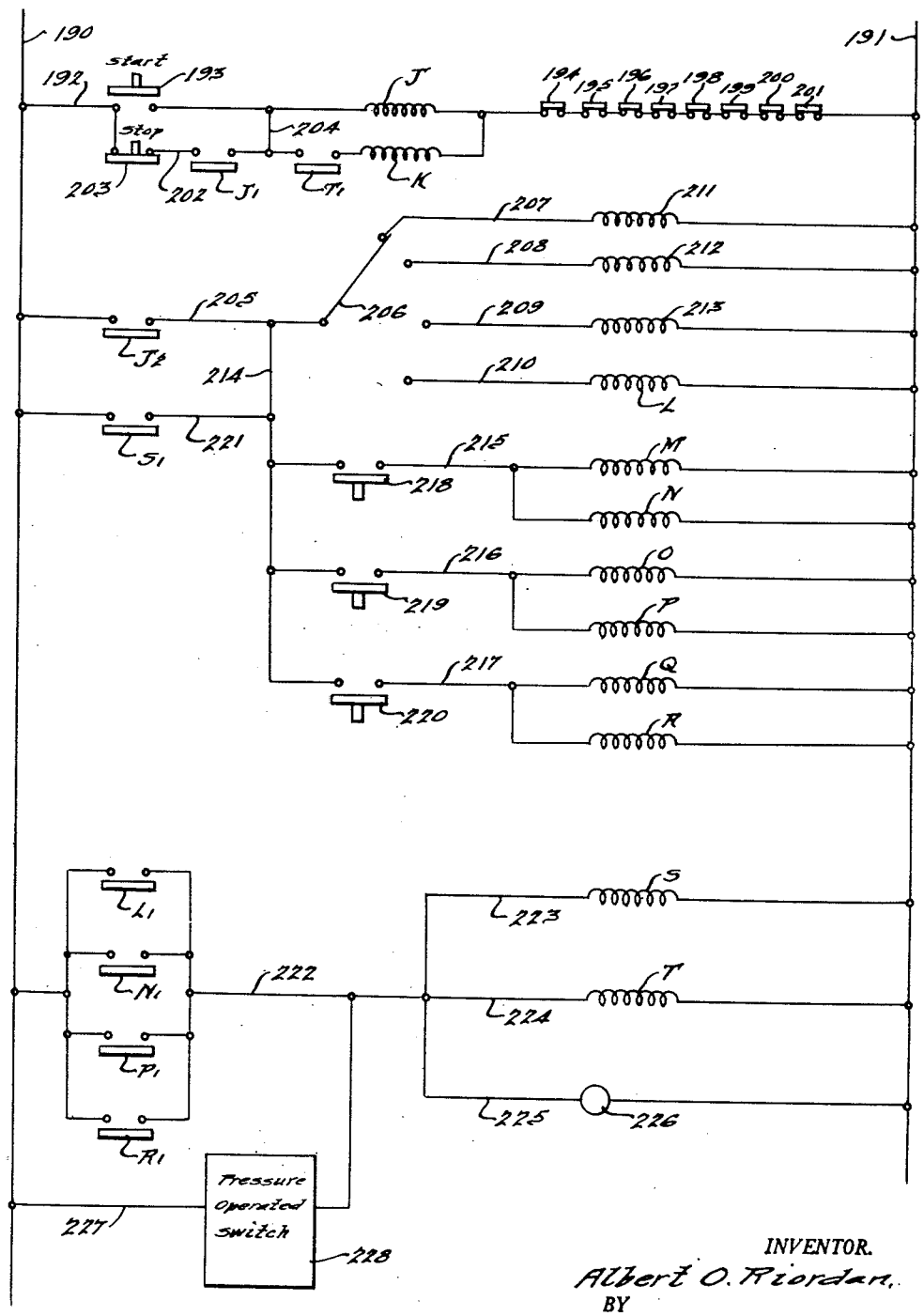
Figures 5 and 6 are diagrams of the electrical control circuits for the form of invention shown in Figure 4.

In general, the objectives of the present invention, in its broadest aspect, are achieved by positioning a weighing scale over the mixer and employing a pneumatic conveying system in the form of a closed loop which starts and ends at a flour bin. The scale hopper is connected to the conveyer loop by a short branch line controlled by a valve which may be operated to divert flour from the conveyer line into the scale hopper. The delivery of flour to the scale hopper is stopped by shifting the diverter valve to its straight-through position. Since there is no appreciable quantity of flour in the short branch line, the valve may be controlled automatically by the tipping of the scale beam without danger of error in the weight of the delivered flour. The main conveyer then may continue to operate without cessation of flow, either for the purpose of delivering flour to other destinations or for the purpose of clearing the line by returning any flour in the line to the bin.

An air separator is associated with the scale hopper. However, in the system of the present invention, since the only flour delivered to the scale hopper is the flour which is separated from the conveying air, it is not necessary to employ an efficient air separator at the scale hopper. A small rudimentary separator, which is inexpensive and requires negligible headroom, is sufficient. None of the flour which remains entrained in the air discharged from the separator is weighed.

All of the various elements of the conveying systems of the present invention are conventional and, accordingly, are illustrated diagrammatically. Similarly, standard pneumatic conveyer practice may be employed in the design and construction of the blowers, feeders, pipe lines, valves, etc. However, it has been found advantageous to employ a higher ratio of flour to conveying air than is normal practice since, with the higher flour concentrations, the small separators used operate more efficiently and the cost of constructing and operating the system is reduced. Thus, as an illustrative example, in a system in which the length of the conveying conduit between the feeder and the most remote destination (disregarding the return line) is forty-five feet, a pipe having an inside diameter of approximately two inches may be used to deliver two hundred pounds of flour per minute with an air pressure at the feeder of about six pounds per square inch. A positive displacement blower which delivers approximately one hundred and fifty cubic feet of air per minute (of atmospheric pressure) may be used. As the length of the conduit increases, it is necessary to increase the air pressure, which increases the volume of air per pound of flour. Since it is undesirable to increase the pressure above about eight to ten pounds per square inch due to loss in efficiency and heating of the air, it is preferred to increase the diameter of the conduit if its length exceeds about one hundred feet. Thus, for a conduit one hundred and twenty-five feet long with several bends, a three-inch conduit is preferred and will deliver two hundred pounds of flour per minute with about two hundred and sixty cubic feet of air per minute at a blower discharge pressure of about seven and a half pounds per square inch.

The system illustrated in Figure 1 includes a single storage bin, means for loading the bin, and means for discharging flour from the bin to either one of two mixers. In loading the bin, flour from sacks or any other source is dumped into a blender 1, from which it is conveyed to the storage bin 2. From this bin, flour may be conveyed selectively to either one of a pair of flour scales 3 and 4 mounted, respectively, over dough mixers 5 and 6. Suitable shut-off valves 7 and 8 are provided between the weighing scales and the mixers for use in discharging the contents of the scales into the mixers after the desired quantity of flour has been delivered.

The conveying system for bin loading includes a positive displacement compressor or blower 9, which preferably is of the Root's type and which supplies air under pressure to a three-way valve 10, which is adjustable between two positions. For bin loading, the valve 10 is so adjusted that it connects the blower to a conveying conduit 11, which supplies air to a motor-driven paddle-wheel type feeder 12, which delivers flour to the current of air flowing between the conduit 11 and the feeder discharge conduit 13. Any suitable form of feeder may be employed for this purpose, suitable types being disclosed, for example, in the patents to Rieth No. 717,926 and Colburn No. 2,550,781. The flour is conveyed by the air current through the conduit 13 and is discharged tangentially into an air separator 14, which is simply a relatively low cylindrical housing having a coverplate provided with an axially-located air discharge opening. The bottom of the cylindrical housing is open and permits the flour to fall by gravity into a motor-driven sifter 15, which is positioned on top of the storage bin and discharges the sifted flour by gravity into the bin. The storage bin preferably is provided with a motor-driven level bar of conventional construction. This bar, which is not illustrated in the drawings, is rotatable on a vertical axis and is positioned near the top of the bin, so that it will distribute flour evenly and permit complete filling of the bin.

A dust separating system is provided for removing any residual fine particles of flour from the air discharged by the separator 14. This includes a centrifugal separator 16, preferably of the type known by the trade-name "Roto-Clone," having an air filter 17 connected to the air outlet thereof. The "Roto-Clone" separator and filter are connected to a main dust collecting conduit 18, which is provided with a branch conduit 20 to the central or axial opening in the top of the separator 14. The "Roto-Clone" separator acts not only as a separator but also as a centrifugal pump which sucks air through the dust collecting conduit 18 and thus facilitates discharge of air from the separator 14.

When it is desired to discharge flour from the bin 2 to either of the mixers, the three-way valve 10 is shifted to connect the motor-driven blower 9 to conduit 21, which supplies air under pressure to a bin discharge feeder 22, similar in construction to the previously described feeder 12. The flour-laden air leaves the feeder 22 through a main conveying conduit 23, which extends past and closely adjacent to the flour scales 3 and 4. A pair of three-way valves 24 and 26, positioned in the conduit 23, operates in one position of adjustment to connect the conduit 23 to branch conduits 30 and 33, respectively. Branch conduit 30 discharges tangentially into a separator 31, similar in construction to the previously described separator 14. The central air discharge opening in the top of separator 31 is connected by a branch conduit 32 to the dust collecting conduit 18. Similarly, the branch conduit 33 discharges tangentially into a similar separator 34, positioned on top of the scale 4. The outlet from the separator 34 likewise is connected to the dust collecting conduit by a branch conduit 35.

An important feature of the invention resides in the fact that the main conveying conduit 23 is connected by a return conduit 27 to the storage bin, discharging tangentially into a separator 28 mounted on top of the bin. The separator 28, which is also similar to the separator 14, has a central air outlet connected to the dust collecting conduit by a branch conduit 29.

The three-way valves 10, 24 and 26 may be of any desired construction. Figure 2 illustrates the preferred form of valve 24. It will be understood that valve 26 may be identical in construction and that valve 10 may be the same except in the minor respects hereinafter indicated.

As shown in Figure 2, the valve includes a stationary cylindrical body 37 having at one side a pair of tubular projections 38 and 39, which projections diverge at an acute angle as they leave the body 37 and which provide outlet openings for the valve. The body 37 is provided with a cylindrical bore 40 extending generally transversely to the tubular projections 38 and 39; and a sliding valve element 41, having a transverse cylindrical passageway 42 formed therein, is slidable within the bore 40. The valve element 41 is provided at its opposite ends with a pair of pistons 43 and 44 for actuating the valve, these pistons being connected to valve element 41 by studs 45 and 46. The valve is operated pneumatically or hydraulically by fluid admitted through a pair of conduits 47 and 48 connected to the ends of the cylindrical body. These conduits are controlled by a four-way valve 49, having a pressure inlet connection 50 and an exhaust connection 51. The valve, which may be operated either manually or by a solenoid 52, is operable in one position to connect the pressure line 50 to the conduit 48 while the exhaust line 51 is connected to the conduit 47; and in the other position will connect the pressure line 50 to the conduit 47 and the exhaust line 51 to the conduit 48.

In the preferred arrangement, pressure is maintained in the line 47 when the solenoid 52 is de-energized and thus the valve normally occupies its straight-through position, which, in the case of valves 24 and 26, permits straight-through flow and blocks the branch conduits 30 and 33, respectively. When the solenoid is energized, the valve 49 shifts, thereby applying pressure to the line 48 and connecting the line 47 to exhaust. This shifts the main conveying valve to its diverting position.

The conveying valve 10 may be identical to the valve illustrated in Figure 2 and is provided with a limit switch 54 having an operating element 55 which is engaged by the cylindrical projection 53 on the movable valve element 41 when the latter moves into the position illustrated in Figure 2. The switch 54, as hereinafter set forth in greater detail, is a double throw switch which closes one circuit when the switch is shifted by engagement with the projection 53 and opens that circuit and closes another when the valve shifts to its diverting position. In the embodiment of the invention shown in Figure 1, valves 24 and 26 are not equipped with the limit switch 54.

The principal elements of a suitable electrical control circuit for the system are disclosed diagrammatically in Figure 3. The circuit is illustrated in a parallel line diagram between the electrical supply lines 55 and 56. It consists in two main parts selectively energized by a limit switch 54, which switch is actuated by the manually-operated valve 10. When the valve is in the position in which it connects the blower 9 to conduit 11 for loading the bin, the switch occupies the position shown in the drawings, in which it connects line 58 to a line 59. When valve 10 is shifted to the position in which it connects the blower 9 to conduit 21 for delivering flour to one of the scales 3 or 4, switch 54 breaks the connection between lines 58 and 59 and connects line 58 to line 60. The valve 10 may correspond to valve 24 shown in Figure 2 except that the operating control valve corresponding to valve 49 of Figure 2 will be manually operated and switch 54 is associated with valve 10 in the manner illustrated in Figure 2.

Line 59 supplies parallel lines 61 and 62, which are connected in series with three parallel relay coils A, B and C and with five normally closed, series-connected overload switch contacts 63, 64, 65, 66 and 67, hereinafter described in greater detail. Line 61 contains a normally open, manually-operated starting switch 68. Line 62 contains in series a normally closed, manually-operated stop switch 69; a normally closed bin safety switch 70; and a normally open contact A1 of relay A. The safety switch is mechanically opened by any suitable means (not shown) in the event that the bin is over-filled. Relay A also has a normally open contact (not shown) in the circuit of a motor which drives a bin leveling bar of conventional construction within the bin 2. This bar merely rotates in a horizontal plane near the top of the bin to spread flour evenly and thus permit complete filling of the bin. Relay B has a normally open contact (not shown) in the circuit of the motor which drives the blender feeder 12. Relay C has a normally open contact C1 in line 71 which extends from the main line 55 to line 61 at a point between overload contacts 64 and 65.

The line 71 contains the coil of the sifter starting relay D, which has a normally open contact (not shown) in the circuit of the motor which drives the sifter 15. Line 72 extends from main line 55 in series through a pair of parallel, normally open contacts C2 and H1 of the relays C and H, respectively, and the coil of the blower starting relay E to line 61 at a point between contacts 65 and 66. Relay coil D has a holding circuit through line 73 which contains the normally open contact D1 of relay D and also a pressure operated switch 74 associated with the outlet of blower 9 and effective to close a normally open contact in line 73 when the blower discharge pressure increases to a predetermined value (for example, five pounds per square inch) and to open the contact when the pressure drops below a slightly lower value (for example, four pounds per square inch). The pressure at which the switch 74 opens is set at a value less than the lowest value which will exist when either of the two conveying lines contains any flour, one of the two lines being from feeder 12 to separator 14 and the other being the line from feeder 22 through lines 23 and 27.

Due to the connecting line 75, the portion of line 73 which contains the pressure-operated switch 74 also acts as a holding circuit for the blower starting relay E, which has a normally open contact (not shown) in the circuit of the motor for the blower 9. As a result, once the blower is started, the relay E will be de-energized and thus stop the blower only after the conveying lines are cleared of flour. Likewise, if the sifter is started, both the sifter and blower will continue in operation until the line 13 is clear of flour because the pressure switch acts as a holding circuit for both of the relays D and E.

During bin loading, the blower starting relay E will be energized by relay contact C2. At the same time, relay contact C1 starts the sifter. When the blower starting relay E is energized, its normally open contact E1 in the line 76 energizes the "Roto-Clone" starting relay I, which contains a normally open contact (not shown) in the motor which drives the "Roto-Clone" separator 16. Relay I also has a normally open contact I1 in a parallel holding line 77, with the result that, once started, the "Roto-Clone" remains in operation until the stop switch 78 is opened manually.

The bin discharge control circuit includes the previously mentioned line 68 from switch 54, which line supplies four parallel lines 79, 80, 81 and 82. Line 68 includes the normally closed emergency stop switch 83. Line 79 includes in series, a starting switch 84, a normally closed contact G1 of a relay whose coil is in line 81, and the coil of a relay F. Line 80 contains, in series, a mercury switch 85, a normally open contact F1 of relay F, and solenoid 52 of air valve 49. Line 81 contains, in series, a starting switch 86, a normally closed contact F2 of relay F, and the coil of relay G. Line 82 contains, in series, a mercury switch 87, a normally open contact G2 of relay G, and the solenoid 88 of valve 26. The bin discharge circuit also includes the bin discharge feeder starting relay H, which contains a normally open contact (not shown) in the circuit of the electric motor that drives the feeder 22. Relay H is connected in a line 89 and is energized by closure of either one of a pair of normally open contacts F3 and G3 of the relays F and G. It will be noted that the lines 76 and 89 are connected to main line 55 through the overload safety contacts 66 and 67.

The mercury switches 85 and 87 are mounted on the beams of the weighing scales 3 and 4, respectively, in such a manner that they normally are closed but each will break its circuit when its beam tips incident to the delivery of the desired weight of flour to the scale. These switches 85 and 86 provide holding circuits for relays F and G, respectively, through line 90, which connects lines 79 and 80, and line 91, which connects line 81 and 92.

The overload safety contacts 63 to 67, inclusive, are normally closed contacts of overload relays (not shown) associated with main circuits of the motors used to drive the system; and they are so arranged that they protect the system against damage. Thus, contact 63 opens only when the motor for the bin leveling bar is overloaded; contact 64 opens only when the motor for the blender feeder 12 is overloaded; contact 65 opens only when the motor for the sifter is overloaded; contact 66 opens only when the motor for the "Roto-Clone" separator is overloaded; and contact 67 opens only when the motor for the blower is overloaded. In addition, line 89 for the bin feeder starting relay H contains a normally closed contact 92 of an overload relay (not shown) in the main circuit of the blower motor and thus operates to break the circuit through line 89 when the blower motor is overloaded.

The operation of the electrical control system illustrated in Figure 3 is as follows:

When it is desired to load the bin, valve 10 is shifted, manually or otherwise, to the position in which it connects the blower to conduit 11, thus placing switch 54 in the position illustrated in Figure 3. When the starting button 68 is closed momentarily, relays A, B and C are energized and are held energized thereafter by the closure of relay contact A1 in the holding circuit 62. Relay A starts the bin leveling bar motor. Relay B starts the motor for blender feeder 12, thus delivering flour to conduit 13. Relay C closes contacts C1 and C2, thus energizing relays D and E, which start the sifter motor and the blower motor, thereby starting the delivery of flour to the bin. Closure of contacts E1 in line 76 starts the "Roto-Clone" separator.

Delivery of flour continues until it is stopped, either manually or automatically, in any one of the following ways:

1. Opening stop switch 69 manually will de-energize relays A, B and C, which stops the bin leveling bar and the blender feeder 12, but the sifter and blower will continue in operation until stopped by opening of the pressure switch 74 after line 13 is cleared of flour.

2. If the bin is completely filled, switch 70 will open and stop the system in the same manner as will operation of the stop switch 69.

3. If either the leveling bar motor or the blender feeder motor is overloaded, contacts 63 or 64 will open and the system will stop in the same manner as when the stop button 69 is operated.

4. If the sifter motor is overloaded, contact 65 opens and the system will stop in the same manner as before except that the sifter also will stop instantly. However, as before, the blower will clear the conduit 13 before stopping.

5. If the motors for the "Roto-Clone" or the blower are overloaded, the entire system will stop immediately, even though the flow conduits are not cleared. This is the only situation during bin loading in which the "Roto-Clone" stops or the blower stops before clearing the conduits.

For discharging flour from the bin, valve 10 is shifted to the position in which it connects the blower to conduit 21. This shifts switch 54 to break the circuits to relays A, B and C, and connects line 53 through line 68 to the line 79, 80, 81 and 82. Delivery of flour is then initiated by closing either one of the switches 84 and 86 momentarily, switch 84 being closed when it is desired to deliver flour to mixer 5 and switch 86 for delivery to mixer 6. The scale of the selected mixer previously has been set, so that the beam will tip when it receives the desired weight of flour.

Closing switch 84, for example, energizes relay F, thus opening contact F2 in line 82 and disabling switch 86. Relay F closes contact F1, thus establishing a holding circuit for relay F through mercury switch 85 and the connecting line 90 and also energizing solenoid 52 of air valve 49. This shifts the flow valve 24 to the position in which conveying conduit 23 is connected to conveying branch conduit 30 leading to the separator 31 over scale 3. As long as relay F is energized, it is impossible to initiate delivery to the other scale 4 by pushing starting switch 86.

The contact F3 of relay F closes and energizes the bin feeder starting relay H, thus starting the bin feeder 22; and contact H1 of relay H then closes and energizes the blower starting relay E. Contact E1 of relay E then closes and energizes the "Roto-Clone" separator starting relay I, which pulls in its holding contact I1. Delivery of flour thus begins and continues until the scale beam tips and breaks the holding circuit through mercury switch 85. This de-energizes solenoid 52 and causes the diverter valve 24 in the flour conveying line to return to its straight-through position, shown in Figure 2. At the same time, relay F is de-energized, which opens contact F3 and stops the bin feeder 22.

When the diverter valve 24 is shifted to its straight-through position, conduit 23 is full of flour. However, the blower starting relay will remain energized through the pressure operated switch 74 until the blower outlet pressure drops incident to a clearing of the conveying conduits by a return of the flour through the conduits 25 and 27 to the bin. After the conveyer conduits are cleared, the blower stops; but the "Roto-Clone" separator continues to operate until stopped by operation of the stop button 78.

Delivery to scale 4 can be effected in a similar manner by closing starting switch 86.

If it is desired to stop the delivery before the scale beam tips, this can be done by opening stop switch 83.

If the motor for the bin discharge feeder 22 is overloaded, contact 92 will open and stop the feeder by de-energizing relay H. This opens contact H1 but the blower starting relay will remain energized through pressure switch 74 until the conveying conduits are clear of flour. Overloading of the motor for the blower or for the "Roto-Clone" separator will open contacts 66 or 67 and stop the whole system.

A further and more elaborate improvement of the invention is illustrated diagrammatically in Figure 4. In this system, flour may be stored in four diffrent bins and flour may be conveyed selectively from any one of the four bins to any one of three mixers. Thus, as shown in the drawings, the system includes flour storage bins 101, 102, 103 and 104 and three mixers 105, 106 and 107. The three mixers are equipped with superimposed weighing scales 108, 109 and 110, respectively, which may discharge by gravity into the mixer on operation of shut-off valves 111, 112 and 113.

The bin loading portion of the system includes a motor-driven blower 114, which may be of the Root's type and which is connected by conduit 115 to a paddle-type feeder 117 associated with a blender 116 into which sacks of flour may be dumped. The feeder 117 is a motor-driven paddlewheel type of conveyer similar to those employed in the system of Figure 1. The mixture of flour and air discharged by the feeder 117 is conveyed through a main bin loading conduit 118, which runs to storage bin 4. Branch conduits 120, 121 and 122 connect the main bin loading conduit to the storage bins 101, 102 and 103. Thus, for example, branch conduit 120 discharges tangentially into a cylindrical separator 123 associated with storage bin 101, and branch conduits 121 and 122 and the main loading conduit 118 similarly discharge into separators 124, 125 and 126 associated with the bins 102, 103 and 104.

It will be noted that the separators 123 to 126, inclusive, do not have axial air discharge openings, such as were provided in the separators employed in the system of Figure 1. On the contrary, the separators employed on the storage bins in the system of Figure 4 are merely cylindrical tanks having a flat closed top and open at the bottom, so that they may discharge both the air and the flour into the sifters 127, 128 and 129 associated with bins 101, 102 and 103, respectively; and, in the case of separator 126, discharging directly into the storage bin 104. Thus, both the air and the flour are carried through the sifters and the air is discharged from the storage bins through air outlets equipped with filters 130, 131, 132 and 133. It will be noted that the filter 133 associated with bin 104 is connected to the bin by a conduit 134, whereas the remaining filters are mounted directly on the bins.

The smallest bin, 104, is intended for use with whole wheat or rye flour, and for that reason is not equipped with a sifter. Each of the storage bins, other than bin 104, is equipped with a motor-driven leveling bar (not shown), similar in construction to the leveling bar incorporated in the system of Figure 1, thus insuring that the bins may be completely filled level. Bin 104, because of its small diameter, requires no leveling bar.

Three-way valves 135, 136 and 137 are positioned in the main bin loading conduit 118 and control communication with the branch conduits 120, 121 and 122. These valves, which preferably are similar in construction to the valve shown in Figure 2, normally occupy their straight-through positions in the main conduit 118, as indicated by the arrows on the valves in Figure 4. In this position, the branch conduits are blocked. However, each valve may be shifted to a position in which it connects the main conduit to the branch conduit and blocks communication to that portion of the main conduit beyond the valve.

It will be apparent that, by manipulating the conveying valves 135, 136 and 137, flour may be delivered from the blender to any one of the three storage bins and that the flour delivered to the bins 101, 102 and 103 is sifted before it is deposited in the bins.

The bin discharge portion of the system shown in Figure 4 includes a motor-driven Root's type blower 138, which discharges into a main air supply line 139, which is connected to a motor-driven paddle-type feeder 140 positioned beneath the storage bin 101. Branch conduits 141, 142 and 143 connect the air supply line 139 to motor-driven paddle-type feeders 144, 145 and 146 associated with the storage bins 102, 103 and 104, respectively. Diverter valves 147, 148 and 149 are positioned in the air supply conduit 139 for connecting that line to the branch conduits 141, 142 and 143, respectively. These diverter valves, which preferably are similar to the valves shown in Figure 2, normally occupy the straight-through position shown in Figure 2, in which air is directed through the conduit 139 to feeder 140, as indicated by the arrows on the valves in Figure 4. However, any one of these valves may be shifted to a position in which it diverts air to its associated branch conduit and blocks communication with the main air conduit beyond the valve.

The mixture of air and flour which leaves feeder 146 is delivered to a main conveying conduit 150, which extends past the flour scales 108, 109 and 110. In the vicinity of the scales, the main conveying conduit 150 is provided with three diverter valves 151, 152 and 153, which may be similar in construction to the valves shown in Figure 2. These three valves normally occupy their straight-through positions, in which they block communication to branch conduits 154, 155 and 156 leading, respectively, to separators 157, 158 and 159 mounted on the scales 108, 109 and 110, respectively. However, when shifted to their diverting positions, the valves connect the main conveying conduit 150 to the branch conduit associated with the valve and block communication with the main conveying conduit beyond the valve.

The main conveying conduit 150 is connected to the feeders 140, 144 and 145 by branch conduits 160, 161 and 162 and diverter valves 163, 164 and 165, respectively. Diverter valves 163, 164 and 165 normally occupy their straight-through position, which establishes the connections indicated by the arrows in Figure 4. These valves are similar in construction to the valves shown in Figure 2. It should be noted, however, that they are reversed in position so that they always discharge through the boss 53 of the valve shown in Figure 2 and may receive the air and flour mixture from either of two conduits. Thus, in the case of valve 163, for example, conduit 160 will be connected to the tubular projection 39 on the valve housing and the main conduit 150, at the point at which it enters the valve 163, will be connected to the tubular projection 38 on the valve housing. Valve 164 is similarly arranged. In the case of valve 165, conduit 162 is connected to the tubular projection 38 and the entering main conduit connection is made through the tubular projection 39 of the valve housing. As a result of these diverter valves, it is possible to connect any one of the feeders 140, 144, 145 or 146 to the main flour conveyer conduit 150.

The main conveying conduit 150, at a point beyond the last scale diverter valve 153, is connected to a return conduit 166, which, in turn, extends past the four storage bins, terminating at a separator 167 mounted on storage bin 101.

Branch conduits 168, 169 and 170 connect the return conduit 166 to separators 170, 171 and 172 mounted, respectively, on the storage bins 102, 103 and 104. Diverter valves 173, 174 and 175 connect the return conduit 166 to the branch conduits 168, 169 and 170 and normally occupy their straight-through positions, in which they connect to separator 167 on bin 101 and block communication between the return conduit 166 and the branch conduits. These valves, however, which also are similar to the valve shown in Figure 2, may be shifted to connect any one of the branch conduits to the return conduit 166 and block off communication with the return conduit beyond the valve.

The separators 167, 170, 171 and 172 are similar in construction and operation to the separators 123, previously described. It will be noted, however, that on storage bin 104 the two separators 126 and 127 are superimposed and, in effect, constitute a single separator, which is merely a cylindrical tanklike structure, closed at the top and having two tangential inlets.

A dust collecting system is provided in connection with the separators on the flour scales. This system includes a "Roto-Clone" separator 176 and associated filter 177, which are connected by a dust conduit 178 to the air outlet of the separator 159 on scale 110. Branch conduits 179 and 180 connect the air outlets of separators 157 and 158 to the dust conduit 178.

Any suitable means may be provided for controlling the system during bin loading, one suitable form of electrical control circuit being illustrated diagrammatically in Figure 5. As there shown, the control circuit is connected between a pair of electrical supply lines 190 and 191. It includes a line 192, containing, in series, a normally open starting switch 193, the coil of relay J, and eight normally closed overload safety switch contacts 194 to 201, inclusive. Line 192 has a parallel branch 202, containing, in series, a normally closed stop switch 203, the normally open contact J1 of relay J, the normally open contact T1 of a relay T, and the coil of a relay K having a normally open contact (not shown) in the main circuit to the motor which drives the blender feeder 117. A connection 204 between lines 192 and 202 completes a holding circuit for relay J through the stop switch and relay contact J1.

The circuit also includes a line 205, containing the normally open contact J2 of relay J and a selector switch 206 which can complete a circuit through any one of lines 207, 208, 209 and 210. Lines 207, 208 and 209 contain the solenoids 211, 212 and 213, respectively, of the air valves which control the conveyer diverter valves 135, 136 and 137. These solenoids correspond to the solenoid 52 of Figure 2 and, when energized, shift the valves to diverting position, thus delivering flour to one of the associated branch lines 160, 161 and 162. Line 210 contains the coil of a relay L.

The circuit also includes a branch line 214 extending from line 205 and which supplies current to three parallel lines 215, 216 and 217. Line 215 contains a normally open limit switch 218 associated with diverter valve 135 and a pair of parallel connected coils of relays M and N. Limit switch 218 corresponds to switch 54 of Figure 2 and is open when the valve 135 is in its straight-through position. Relay M controls sifter 127 and has a normally open contact (not shown) in the main circuit of the motor which drives sifter 127. Relay N controls the leveling bar in bin 101 and has a normally open contact (not shown) in the main circuit of the motor which drives that leveling bar. Line 216 contains a similar normally open limit switch 219 associated with diverter valve 136 and a pair of parallel connected coils of relays O and P. Relay O controls sifter 128 and has a normally open contact (not shown) in the main circuit of the motor which drives that sifter. Relay P controls the leveling bar in bin 102 and has a normally open contact (not shown) in the main circuit of the motor which drives that leveling bar. Line 217 contains a similar normally open limit switch 220 associated with diverter valve 137 and a pair of parallel connected coils of relays Q and R. Relay Q controls the sifter 129 and has a normally open contact (not shown) in the main circuit of the motor which drives that sifter. Relay R controls the leveling bar in bin 103 and has a normally open contact (not shown) in the main circuit of the motor which drives that leveling bar. Because of its smaller size, bin 104 has no leveling bar.

Lines 215, 216 and 217 also may be energized by a line 221, which contains a normally open contact S1 of a relay S. This line 221 also acts as a holding circuit to energize line 205 after relay J is de-energized.

The circuit includes a line 222, which may be energized by any one of the parallel normally open contacts L1, N1, P1 and R1 of relays L, N, P and R, and, when energized, supplies current to parallel lines 223, 224 and 225. Line 223 contains the coil of relay S which controls the compressor 114 and contains a normally open contact (not shown) in the main line of the motor which drives the compressor. Relay T has a normally open contact in line 202, as previously mentioned, and hence indirectly controls the blender feeder 117. Line 225 contains a signal light 226, which indicates to the operator that a bin loading operation is in progress.

Line 222 also may be energized by a holding circuit through a line 227 containing a pressure-operated switch 228 associated with the air outlet from blower 114. The pressure switch, which is a standard commercial item, is set to close the circuit through line 227 when the pressure of the air discharged by blower 114 reaches a predetermined value sufficient to convey flour to the closest destination, i. e., bin 101, and to open the circuit when the pressure drops incident to a substantially complete clearing of flour from the conveying conduits. This switch keeps the compressor running after the stop button 203 breaks the circuit through relays J and K until after the flour lines are clear. Moreover, it keeps all of the rest of the circuit energized through contact S1 of relay S. As a result, when the stop button is depressed, the blender feeder 117 stops but the blower continues to run, as well as the sifter and leveling bar of the bin to which delivery is occurring, and the diverter valve does not return to its straight-through position until the conveying conduit is cleared.

In order to effect delivery to any desired bin, the selector switch 206 is moved to the appropriate contact in one of the lines 207 to 210, inclusive. Lines 207 to 209, which control bins 101 to 103, respectively, operate, when energized, to shift the associated diverter valve 135, 136, or 137. If bin 104 is selected, no valve is operated but relay L is energized. The diverter valves, in turn, close limit switches 218, 219 and 220, respectively, which, in turn, energize the relays which start the sifter and leveling bar in the selected bin. The starting relays N, P and R for the leveling bars (or the relay L when bin 104 is selected) energize line 222 and thus start the compressor and also energize relay T, which closes contact T1 and thus energizes the starting relay K for the blender feeder 117. When thus started, the system delivers flour to the selected bin until stopped by de-energization of relays J and K. This can be done by manipulation of the stop button 203 or will result automatically if any one or more of the safety overload contacts 194 to 201, inclusive, open the circuit through line 192.

The safety overload contacts are normally closed contacts associated with overload relays, the coils of which (not shown) are connected in the main lines to the drive motors of the system, and each operates to open its contact when the associated motor is overloaded. Contact 194 is controlled by the circuit of the motor for blender 117; contact 195 by the motor circuit for the compressor 114; contact 196 by the motor circuit for sifter 127; contact 197 by the motor circuit for the leveling bar in bin 101; and contacts 198 to 201, inclusive, are controlled, respectively, by the circuits of the motors for the sifters and leveling bars associated with bins 102 and 103. It will be noted that, in the case of an overload on the motors of the sifter, leveling bar or compressor, the system will clear the conveyer conduit of flour before shutting down these three units. Damage to the motors can be avoided by setting the overload contacts to open at an overload which the motors can carry for the brief interval required to clear the lines.

Figure 6:
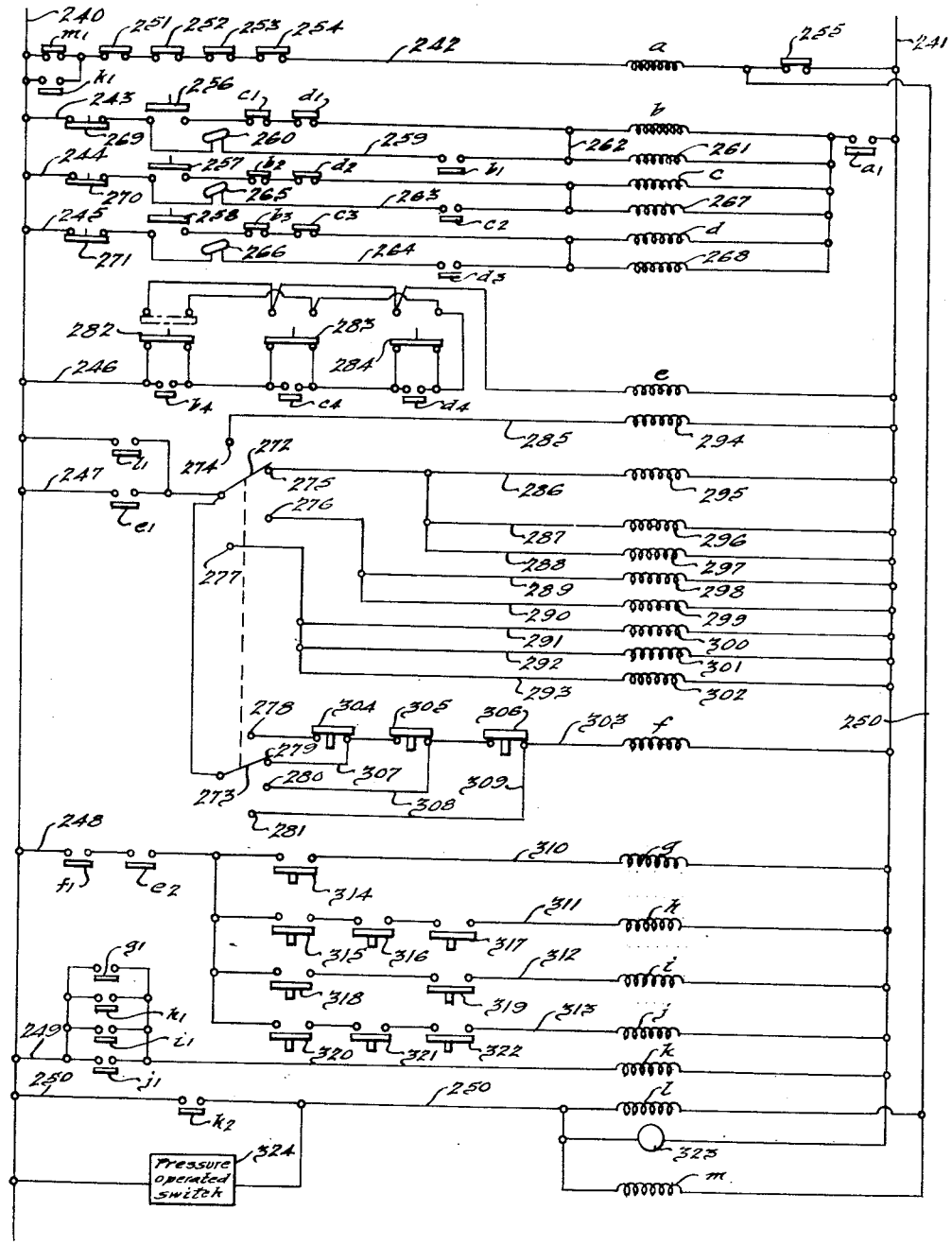

The primary portions of the preferred electrical circuit for controlling delivery of flour from any one of the four bins to any one of the three mixers are illustrated diagrammatically in Figure 6. As there shown, the circuit is supplied with electricity by power lines 240 and 241, between which extend the main circuit lines 242 to 250, inclusive.

Line 242 is the overload safety control circuit which operates to stop the system by a desired sequence of operations in the event of motor overloads. Line 242 contains the coil of a relay $a$, the normally closed contact $m1$ of a relay $m$, and five normally closed overload safety contacts 251 to 255, inclusive. The contacts 251 to 254, inclusive, are normally closed contacts of overload relays the coils of which (not shown) are connected in the main circuits of the motors which drive the bin discharge feeders 140 to 146, respectively. Contact 255 is controlled by a similar overload relay coil (not shown) in the main circuit of the motor which drives compressor 138. Each of these relays opens its contact in the event that the motor with which it is associated becomes overloaded. A normally open contact $k1$ of a relay $k$ is connected in parallel with contact $m1$ and serves to energize line 242 when relay $k$ (described hereinafter) is energized, even though contact $m1$ is open. It will be noted that, when the system is in its inoperative or idle condition illustrated, the coil of relay $a$ is energized as soon as the main power switch (not shown) is closed to energize lines 240 and 241 and will remain energized under all normal conditions of operation.

Lines 243, 244 and 245 are the scale selector circuits which control the destination of the delivered flour and also determine the amount which is received by the selected destination. All of these circuits are completed through the normally open contact $a1$ of the relay $a$. Under all normal operating conditions, contact $a1$ is closed because relay $a$ is energized. The lines 243, 244 and 245 contain normally open starting switches 256, 257 and 258, respectively, and also the coils of relays $b$, $c$ and $d$, respectively. Line 243 has a parallel line 259 containing a normally closed mercury switch 260 that is mounted on the beam of scale 108, a normally open contact $b1$ of relay $b$, and also a solenoid 261 of the solenoid air valve which, when energized, shifts the diverter valve 151 to its diverting position. The mercury switch 260 is so positioned on the scale beam that, when the beam tips incident to the receipt by the scale hopper of the weight of flour for which the scale is set, the switch breaks the parallel circuit 259. Since the starting button 256 will remain closed only momentarily, a holding circuit for solenoid 261 is provided through mercury switch 260 and contact $b1$, and this circuit also holds the coil of relay $b$ energized due to the connecting line 262.

Lines 244 and 245 have branch lines 263 and 264, which contain similar normally closed mercury switches 265 and 266 mounted, respectively, on the beams of scales 109 and 110; and the branch lines also contain, respectively, normally open contacts $c2$ and $d3$ of the relays $c$ and $d$ and solenoids 267 and 268 of the solenoid air valves which shift the diverter valves 152 and 153, respectively, to their diverting position when their solenoids are energized.

As a result of the above-described circuits, any one of the diverter valves 108, 109 and 110 may be shifted to its diverting position and will remain in that position until its main control line 243, 244 or 245 is broken. Emergency stop switches 269, 270 and 271 are provided in the lines 243, 244 and 245, respectively, so that any one of these lines may be broken at any time and thus de-energize the related valve solenoid and stop delivery of flour to the associated scale hopper. The circuits 243, 244 and 245 also will be broken by contact $a1$ in the event that any of the above-mentioned motors is overloaded and thus open one of the safety overload contacts in line 242.

Once one of the starting switches 256, 257 and 258 is closed momentarily, the associated line will remain energized until the selected scale hopper receives the desired weight of flour and then will be de-energized by opening of the mercury switch on the scale beam. Thus, the diverter valve for the selected scale will not return to its straight-through position until the scale is satisfied.

Conventional interlocking relay contacts are provided to prevent the energization of any one of the scale selector control lines 243, 244 and 245 while another is energized. Thus, line 243 contains the normally closed contacts $c1$ and $d1$ of relays $c$ and $d$; line 244 contains the normally closed contacts $b2$ and $d2$ of relays $b$ and $d$; and line 245 contains the normally closed contacts $b3$ and $c3$ of relays $b$ and $c$. This prevents the selection of one scale hopper during delivery of flour to any other. As will be pointed out hereinafter, the relay contacts $m1$ and $k1$ also serve to prevent selection of a scale for receipt of flour during the period after completion of one delivery that is required to clear the conveyor line of flour.

In addition to making a selection of the destination by depressing one of the start buttons 256, 257 and 258, the operator must also select the bin from which flour is to be drawn. This is done by shifting a tandem bin selector tap switch having a pair of mechanically connected contact arms 272 and 273, which arms are electrically connected to line 247. Switch arm 272 is adapted to make contact with any one of four contacts 274, 275, 276 and 277, which correspond, respectively, to the bins 101 to 104, inclusive. Switch arm 273 is adapted to make contact with four contacts 278, 279, 280 and 281, which similarly correspond to the four bins. The arms move together and hence always engage one contact in each group.

The line 247 to the bin selector switch is energized by closure of a normally open contact $e1$ of relay $e$, which, in turn, is energized by the scale selector circuits through a series of relay contacts and limit switches in line 246. Thus, line 246 contains, in series, the normally open contacts $b4$, $c4$ and $d4$ of relays $b$, $c$ and $d$, and each of these contacts is connected in parallel with a pair of contacts in a limit switch associated with one of the scale diverter valves 151, 152 and 153. The limit switch 282 is associated with the diverter valve 151 for scale 108 and corresponds to the limit switch 54 of Figure 2 except that it is a double throw switch. When the valve 151 is in its straight-through position, the switch contact 282 occupies the solid line position shown in Figure 6 and thus bridges the otherwise open circuit at relay contact $b4$. When valve 151 is shifted to its diverting position, the contact of switch 282 occupies the dotted line position shown in Figure 6 and closes the circuit through line 246 and relay coil $e$. Scale diverter valves 152 and 153 are equipped with similar limit switches 183 and 184, respectively, which are associated with the respective relay contacts $c4$ and $d4$ in line 246 in the same manner as limit switch 182 is associated with contact $b4$.

As a result of this arrangement, energization of relay $b$ by start button 256 will not energize relay $e$ until after the diverter valve 151 has shifted to its diverting position; but subsequent de-energization of relay $b$ will immediately de-energize relay $e$, even though diverter valve 151 for some reason fails to return to its straight-through position. The same result occurs in the event of operation of valves 152 or 153. More important, if any one of the three scale diverter valves 151, 152 and 153 is out of its straight-through position, it is impossible to energize relay $e$ by operating the start button which controls one of the other scale diverter valves.

Arm 272 of the bin selector switch controls the energization of lines 285 to 293, inclusive, which contain, respectively, the solenoids 294 to 302, inclusive, that actuate the air control valves of the diverter valves, as follows: solenoid 294 controls valve 163; solenoid 295 controls valve 164; solenoid 296 controls valve 147; solenoid 297 controls valve 173; solenoid 298 controls valve 148; solenoid 299 controls valve 174; solenoid 300 controls valve 149; solenoid 301 controls valve 165; and solenoid 302 controls valve 175. The arrangement is such that, when the solenoids 294 to 302 are de-energized, the controlled diverter valves are in their straight-through positions, in which flow may occur through the valves in the directions indicated by the arrows in Figure 4. If any solenoid is energized, its associated valve is shifted to its diverting position. These solenoids correspond to the solenoid 52 in Figure 2.

It will be noted that solenoid 294 is energized when switch arm 272 engages contact 274, thus shifting valve 163 to the position in which flour may be delivered from bin 101; solenoids 295, 296 and 297 are energized when switch arm 272 engages contact 275, thus shifting valves 164, 147 and 173 into the positions in which flour may be delivered from bin 102; solenoids 298 and 299 are energized when switch arm 272 engages contact 276, thus shifting valves 148 and 174 into the position in which flour may be delivered from bin 103; and solenoids 300, 301 and 302 are energized when switch arm 272 engages contact 277, thus shifting valves 149, 165 and 175 into the positions in which flour may be delivered from bin 104.

Contact 278 of the second switch arm is connected to a line 303, which contains three normally closed limit switches 304, 305 and 306 and the coil of a relay $f$. Limit switches 304, 305 and 306 are associated, respectively, with diverter valves 173, 174 and 175 in the same manner as limit switch 54 is associated with the valve shown in Figure 2. They are so constructed that they are closed when their associated valves are in the straight-through position. Accordingly, switch 304 is open when flour is drawn from bin 102; switch 305 is open when flour is drawn from bin 103; and switch 306 is open when flour is drawn from bin 104. All three switches remain closed when flour is drawn from bin 101.

Contacts 279, 280 and 281 of switch arm 273 are connected by lines 307, 308 and 309 to line 303 at points positioned, respectively, beyond the switches 304, 305 and 306. Accordingly, the coil of relay $f$ is energized at any time current is supplied to switch arm 273 unless one of the valves 173, 174 and 175 is in an improper position. Since relay $f$ has a normally open contact $f1$ in line 148, which supplies current to the starting relays $g$, $h$, $i$ and $j$ for the bin feeders 140, 144, 145 and 146, this arrangement prevents the feeding of flour to the conveyer in the event that one of the valves 173, 174 and 175 is in an improper position. The previously-mentioned relay $e$ also contains a normally open contact $e2$ in the line 148, and this insures that no flour will be fed to the conveyer if any one of scale diverter valves 151, 152 and 153 is in an improper position. As a further insurance that the remaining diverter valves will be properly positioned, limit switches associated with the valves which must be shifted to effect delivery from any bin are connected in the line which contains the coil of the bin feeder starting relays for that bin. Thus, line 310 for the coil of the starting relay $g$ for bin feeder 140 contains a normally open limit switch 314, which is associated with valve 163. When valve 163 is shifted to connect conduit 160 to conduit 150, as is necessary to withdraw flour from bin 101, limit switch 314 closes. The line 311 for the coil of the starting relay $h$ for bin feeder 144 contains similar normally open limit switches 315, 316 and 317, which are associated, respectively, in like manner with the diverter valves 147, 164 and 173, which must be shifted to withdraw flour from bin 102. Line 312, which contains the coil of starting relay $i$ for bin feeder 145, contains similar normally open limit switches 318 and 319, which are associated, respectively, with diverter valves 148 and 174; and line 313 for the starting relay $j$ for bin feeder 146 contains the normally open contacts of limit switches 320, 321 and 322, which are similarly associated with diverter valves 149, 165 and 175, which must be shifted to withdraw flour from bin 104. Accordingly, the bin feeder starting relays are energized only when the diverter valves are in proper position for the selected conveying operation.

It may be noted that each of the diverter valves 173, 174 and 175 differs from the remaining diverter valves in that it is equipped with two limit switches: one a normally closed limit switch in line 303; and the other a normally open limit switch in the feeder starting relay circuits. These two limit switches may be separate switch units mounted side by side in the manner of switch 54 in Figure 2; or may be a single switch controlling a pair of circuits. Thus, for example, the switches 304 and 317 may be combined as one movable contact which opens the circuit through line 303 and closes the circuit through line 311 when valve 173 is shifted to its diverting position. Limit switches 305 and 319 similarly may be combined, as may be switches 306 and 322.

The relays $g, h, i$ and $j$ contain normally open contacts (not shown) positioned, respectively, in the main circuits of the motors which drive the bin feeders 140, 144, 145 and 146 and thus, when one of these relays is energized, it starts the appropriate feeder. The feeder will remain in operation until relay $e$ is deenergized by the return of one of the scale diverter valves 151, 152 and 153 to its straight-through position. This opens contact $e2$ and de-energizes the feeder relays.

Line 249 contains the coil of relay $k$ and is energized by closure of any one of the normally open contacts $g1, h1, i1$ and $j1$ of the bin feeder starting relays $g, h, i$ and $j$. Relay $k$, in turn, closes a normally open contact $k2$ in line 250 and thus energizes the coil of a starting relay $l$ for the compressor 138 and also a pilot light 323 and the coil of a relay $m$, which are connected in parallel with relay $l$. As previously indicated, relay $l$ is energized when any one of the bin feeder starting relays is energized and it will be de-energized when the bin feeder starting relays are de-energized by return of the diverted scale valve to its straight-through position. However, the conveyor line must be cleared of flour before the compressor stops and, accordingly, the compressor starting relay is held energized by a pressure-operated switch 324, notwithstanding the opening of contact $k2$. Switch 324, which is similar in construction and function to switch 228 described in connection with Figure 5, is closed in response to the pressure of the air discharged by blower 138 and opens in response to the drop in that pressure which occurs when the conduits are cleared of flour. This brings the system to a complete stop and returns all diverted valves to their normal positions by reason of the opening of contact $h$ of the compressor starting relay $l$. The scale diverter valve previously had returned to its straight-through position, thus de-energizing relay $e$, which, in turn, de-energized the bin feeder relays and stopped delivery of flour to the system.

During the interval between the stopping of the bin feeder, which de-energizes relay $k$, and the stopping of the compressor as the result of opening of switch 324, there is still flour in the return line, and, therefore, that flour would be trapped and plug the line if one of the scale diverter valves were shifted to its diverting position as the result of operation of one of the starting switches 256, 257 and 258. This is prevented by reason of the fact that, during that interval, contacts $m1$ and $k1$ in line 242 are both open, thus de-energizing relay $a$ and opening contact $a1$, which disables the starting or scale selecting circuits.

It will be noted that, unlike the remaining lines in the circuit, line 250 is not connected directly to the main supply line 241 but is connected only through the overload safety contact 255 in line 242. As a result of this arrangement, an overload on the compressor motor will stop the entire system, but an overload on any other motor will stop everything except the compressor and the compressor will hold the diverted bin valves against shifting until after the conduits are cleared of flour.

For convenience, each of the starting switches 256, 257 and 258 is located on the mixer which it controls, while the selector switch 272—273 may be located in a central position in the mixing room.

While only two forms of the invention are illustrated and described, it will be apparent that the principles of the invention may be embodied in a wide variety of forms. Thus, for example, the multiple bin system of Figure 4 employs a single main conveying conduit for a plurality of bins, but in some cases it may be desirable to use two main conveying conduits, one of which would run from one or more bins past a series of mixers and the other from other bins past the same mixers. This would simply involve a duplication of the more simplified form of system illustrated in Figure 1 except that each scale hopper, or at least some of them, would be supplied selectively by either of the two conveyers.

What is claimed is:

1. A pneumatic conveying system for delivering bulk flour or like material from a container to a remote destination, including a container from which material may be drawn, a weighing scale hopper at a remote destination to which material may be delivered, said hopper having a movable element which moves from its normal position when the hopper has received a predetermined weight of flour, a main conveying conduit extending in a closed loop from its inlet end at the container past the scale hopper in close proximity thereto and returning to the container at its discharge end, means including a diverter valve in the main conduit operative in its diverting position to divert material from the main conduit into the receptacle and in its straight-through position to block communication between the main conduit and the scale hopper and permit flow through the main conduit, means for blowing air through the main conduit, means for feeding material from the container into the main conduit at its inlet end for delivery by the air flowing therethrough into the scale hopper when said valve is in diverting position, means operable in response to movement of said element from its normal position while material is being conveyed through said main conduit to shift said valve to its straight-through position in order to terminate the delivery of material to said scale hopper, and means actuated in response to movement of said diverter valve to its straight-through position for stopping the feed of material to the main conduit in order to permit the air blowing means to clear the main conduit by returning the material therein to the container after the diverter valve is returned to its straight-through position.

2. A system as defined in claim 1, including mechanism for stopping operation of said blowing means, said mechanism including means to delay the stopping of said blowing means until after flour is blown clear of the main conveyor conduit.

3. A system as defined in claim 2, including means for shifting said valve to its diverting position and means operative after the valve has been returned to its straight-through position to prevent operation of said valve shifting means until after the conveyor conduit is cleared of material.

4. A system as defined in claim 2, including means for shifting said valve to its diverting position and starting the air blowing means and the material feeding means, and means operable on return of the valve to its straight-through position to prevent shifting of said valve to its diverting position until after said air blowing means has stopped.

5. A system as defined in claim 1, in which a pressure responsive means operatively connected to the air blowing means and responsive to the pressure of the air delivered by said means is provided for stopping operation of said blowing means when the air pressure drops incident to the clearing of flour from the main conveyor conduit.

6. A system as defined in claim 5, including means for shifting said valve to its diverting position and means operative after the valve has been returned to its straight-through position to prevent operation of said valve shifting means until after the conveyor conduit is cleared of material.

7. A system as defined in claim 1, including means for shifting said valve to its diverting position and means operative after the valve has been returned to its straight-through position to prevent operation of said valve shifting means until after the conveyor conduit is cleared of material.

8. A pneumatic conveying system for delivering bulk flour or like material to any one of a plurality of destinations, including a container from which the material may be drawn, a plurality of weighing scale hoppers to which it may be delivered, each of said scale hoppers having a movable element which moves from its normal position when the hopper has received a predetermined weight of flour, a main conveying conduit extending in a closed loop from the container past the vicinity of said scale hoppers and back to the container, means including a plurality of diverter valves in the main conduit associated respectively with said scale hoppers and each operative in its diverting position to divert material from the main conduit into the associated hopper and in its straight-through position to block communication between the main conduit and the hopper and permit flow through the main conduit, means for blowing air through the main conduit, means for feeding material from the container into the main conduit for delivery by the air flowing therethrough to any scale hopper whose diverter valve is in its diverting position, means operable in response to movement of the movable element of any of said scale hoppers from its normal position while material is being delivered to such scale hopper to shift the valve associated with said hopper to its straight-through position, and means actuated in response to movement of said last mentioned diverter valve to its straight-through position for stopping the feed of material into the main conduit in order to permit the air blowing means to clear the main conduit by returning the material therein to the container after the diverter valve is returned to its straight-through position.

9. A system as defined in claim 8, including mechanism for stopping operation of said blowing means, said mechanism including means to delay the stopping of said blowing means until after flour is blown clear of the main conveyor conduit.

10. A system as defined in claim 9 including means for shifting any one of said diverter valves to its diverting position, means operable incident to the movement of any one of said valves to diverting position to prevent shifting of any other of said valves to diverting position while said one is in a diverting position, and means operable when the air blowing means is operating to prevent shifting of any of said valves from its straight-through to its diverting position until after the main conveying conduit is clear of flour.

11. A system as defined in claim 8, including pressure responsive means operatively connected to the air blowing means and responsive to the pressure of the air delivered by said means for stopping operation of said blowing means when the air pressure drops incident to the clearing of flour from the main conveyor conduit.

12. A system as defined in claim 11 including means for shifting any one of said diverter valves to its diverting position, means operable incident to the movement of any one of said valves to diverting position to prevent shifting of any other of said valves to diverting position while said one is in a diverting position, and means operable when the air blowing means is operating to prevent shifting of any of said valves from its straight-through to its diverting position until after the main conveying conduit is clear of flour.

13. A system as defined in claim 8, including means for shifting any one of said diverter valves to its diverting position, means operable incident to the movement of any one of said valves to diverting position to prevent shifting of any other of said valves to diverting position while said one is in a diverting position, and means operable when the air blowing means is operating to prevent shifting of any of said valves from its straight-through to its diverting position until after the main conveying conduit is clear of flour.

References Cited in the file of this patent

UNITED STATES PATENTS

| Number | Name | Date |
|---|---|---|
| 1,301,168 | Renkin | Apr. 22, 1919 |
| 1,935,843 | Goebels | Nov. 21, 1933 |
| 2,580,581 | Niemitz | Jan. 1, 1952 |